(12) United States Patent
Vaidyanathan

(10) Patent No.: US 7,257,734 B2
(45) Date of Patent: Aug. 14, 2007

(54) METHOD AND APPARATUS FOR MANAGING PROCESSORS IN A MULTI-PROCESSOR DATA PROCESSING SYSTEM

(75) Inventor: Basu Vaidyanathan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 788 days.

(21) Appl. No.: 10/621,945

(22) Filed: Jul. 17, 2003

(65) Prior Publication Data

US 2005/0015661 A1    Jan. 20, 2005

(51) Int. Cl.
G06F 11/00 (2006.01)
(52) U.S. Cl. .............. 714/13; 714/10; 714/11; 714/12
(58) Field of Classification Search .......... 714/10–13
See application file for complete search history.

(56) References Cited

U.S. PATENT DOCUMENTS

| | | | | |
|---|---|---|---|---|
| 5,485,604 A | * | 1/1996 | Miyoshi et al. | 714/10 |
| 5,764,882 A | * | 6/1998 | Shingo | 714/11 |
| 5,802,365 A | * | 9/1998 | Kathail et al. | 719/321 |
| 5,828,578 A | * | 10/1998 | Blomgren | 716/3 |
| 5,867,658 A | * | 2/1999 | Lee | 709/222 |
| 5,901,281 A | * | 5/1999 | Miyao et al. | 714/11 |
| 6,862,693 B2 | * | 3/2005 | Chaudhry et al. | 714/11 |
| 7,017,074 B2 | * | 3/2006 | Okin | 714/11 |
| 7,028,218 B2 | * | 4/2006 | Schwarm et al. | 714/11 |
| 7,085,959 B2 | * | 8/2006 | Safford | 714/11 |
| 7,114,095 B2 | * | 9/2006 | Milojicic et al. | 714/13 |
| 2004/0073835 A1 | * | 4/2004 | Kim | 714/13 |

* cited by examiner

Primary Examiner—Robert W. Beausoliel
Assistant Examiner—Emerson Puente
(74) Attorney, Agent, or Firm—Duke W. Yee; Libby Z. Handelsman; Lisa L. B. Yociss

(57) ABSTRACT

A method, apparatus, and computer instructions for managing processors in a data processing system. Monitoring is performed for a failed processor in the processors. Responsive to detecting a failed processor, a spare processor from the set of spare processors is identified. The set of spare processors are located on different modules and wherein the spare processor is identified as minimizing degradation in processing performance.

12 Claims, 4 Drawing Sheets

METHOD AND APPARATUS FOR MANAGING PROCESSORS IN A MULTI-PROCESSOR DATA PROCESSING SYSTEM

BACKGROUND OF THE INVENTION

1. Technical Field

The present invention relates generally to an improved data processing system and in particular to a method and apparatus for facilitating redundancy in a data processing system. Still more particularly, the present invention relates to a method, apparatus, and computer instructions for identifying a spare processing unit in response to a failure of a processor in the data processing system.

2. Description of Related Art

As data processing systems become more advanced, the processing power within the systems has increased as new systems are released. One increase in processing power is provided through faster and better processors. Another increase in processor power results from using multiple processors within a data processing system. One type of multi-processor system includes the use of a multi-chip module (MCM). An MCM is a module or unit that contains multiple processor dies or chips on a single chip carrier. A chip carrier is a platform on which chips, passive components, device encapsulants, and thermal enhancement hardware are attached. These MCMs may include different numbers of chips, such as four or eight processing chips within a single MCM.

As an added feature in a data processing system, an additional MCM is often included in addition to the other MCMs. This spare MCM is employed to facilitate hot sparing of processors. In some cases, a number of processors within an MCM may be employed for hot sparing. In other words, these additional MCMs or processors are employed as replacements in case of a processor failure within the data processing system. The replacement processor replaces the failed one without requiring the data processing system to be restarted or reinitialized. One problem associated with this type of replacement of a failed processor is a reduction in processing efficiency. If a failed processor on one MCM is replaced with a failed processor on another MCM, the scattering of work load may affect the throughput or performance of applications.

The present invention recognizes that this problem occurs because of memory latency or cache affinity problems. A cache is an associative memory with respect to a processor chip. Many data processing systems use L1, L2, and L3 caches to increase performance. An L1 cache is located in a processor. An L2 cache located on a die and may be shared by all processors on the same die. An L3 cache is shared by all processors within an MCM. If a replacement processor for a failed processor is located on a different MCM, then any processing by those processors cannot use the L3 cache. In this manner, performance and throughput may be reduced because of this affinity problem with respect to the cache system.

Therefore, it would be advantageous to have an improved method, apparatus, and computer instructions for marking and selecting spare processors.

SUMMARY OF THE INVENTION

The present invention provides a method, apparatus, and computer instructions for managing processors in a data processing system. Monitoring is performed for a failed processor in the processors. Responsive to detecting a failed processor, a spare processor from the set of spare processors is identified. The set of spare processors are located on different modules and wherein the spare processor is identified as minimizing degradation in processing performance.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
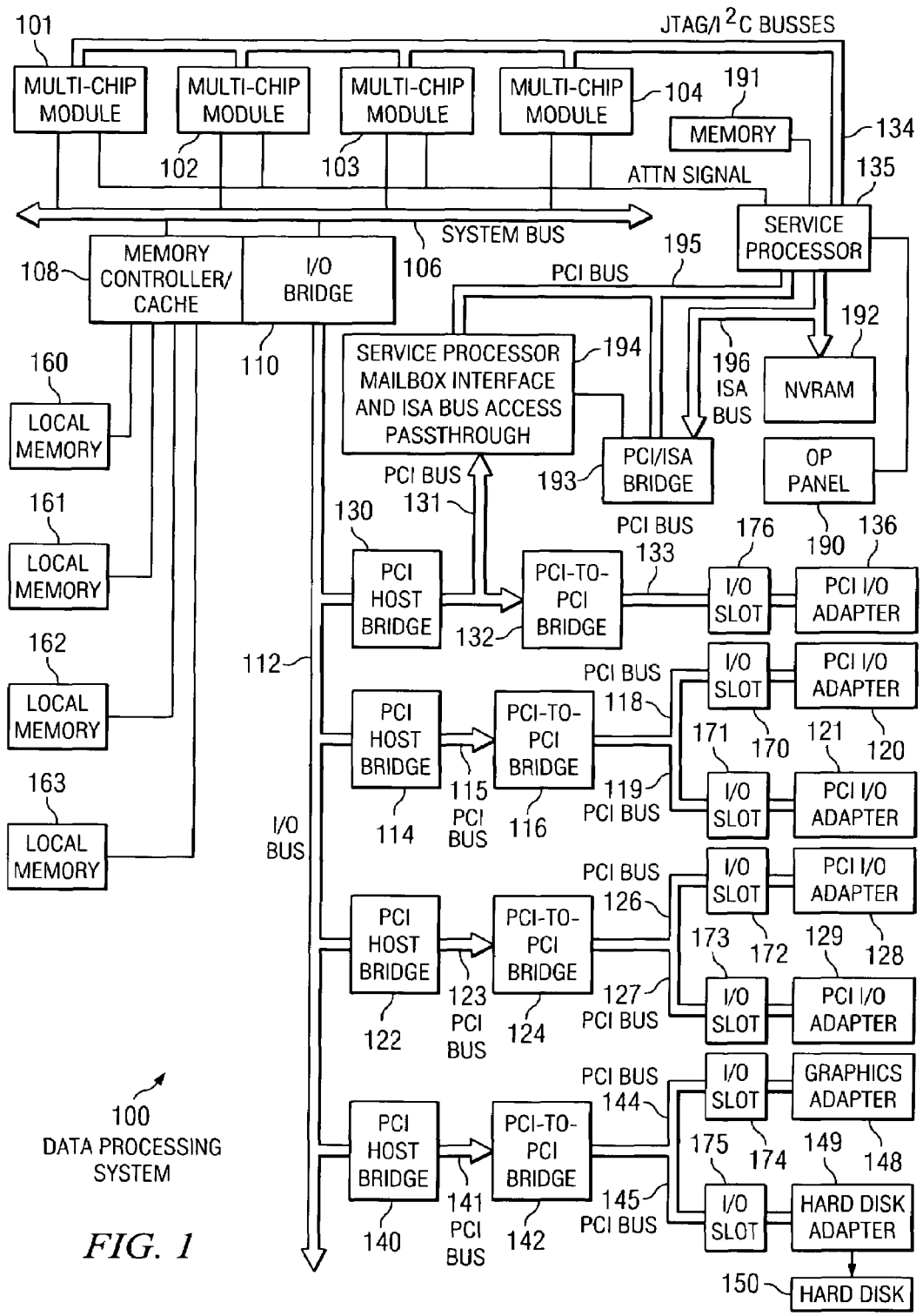
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of multi-chip modules (MCMs) 101, 102, 103, and 104 connected to system bus 106. In this example, each MCM includes eight processors.

Data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120–121, 128–129, and 136, graphics adapter 148, and hard disk adapter 149 may be assigned to different logical partitions.

In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120–121, 128–129, 136, graphics adapter 148, hard disk adapter 149, each of MCMs 101–104, and memory from local memories 160–163 is assigned to each of the three partitions. In these examples, memories 160–163 may take the form of dual in-line memory modules (DIMMs). DIMMs are not normally assigned on a per DIMM basis to partitions. Instead, a partition will get a portion of the overall memory seen by the platform. For example, MCM 101, some portion of memory from local memories 160–163, and I/O adapters 120, 128, and 129 may be assigned to logical partition P1; MCMs 102–103, some portion of memory from local memories 160–163, and PCI I/O adapters 121 and 136 may be assigned to partition P2; and MCM 104, some portion of memory from local memories 160–163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows XP operating system may be operating within logical partition P3. Windows XP is a product and trademark of Microsoft Corporation of Redmond, Wash.

Peripheral component interconnect (PCI) host bridge 114 connected to I/O bus 112 provides an interface to PCI local bus 115. A number of PCI input/output adapters 120–121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120–121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128–129. PCI I/O adapters 128–129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128–129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. Non-volatile random access memory (NVRAM) storage 192 is connected to the ISA bus 196. Service processor 135 is coupled to service processor mailbox interface and ISA bus access pass-through logic 194 through its local PCI bus 195. Service processor 135 is also connected to MCMs 101–104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host MCMs 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I$^2$C busses 134 to interrogate the system (host) processors 101–104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating processors on MCMs 101–104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160–163. Service processor 135 then releases host processors 101–104 for execution of the code loaded into local memory 160–163. While processors on MCMs 101–104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors on MCMs 101–104, local memories 160–163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
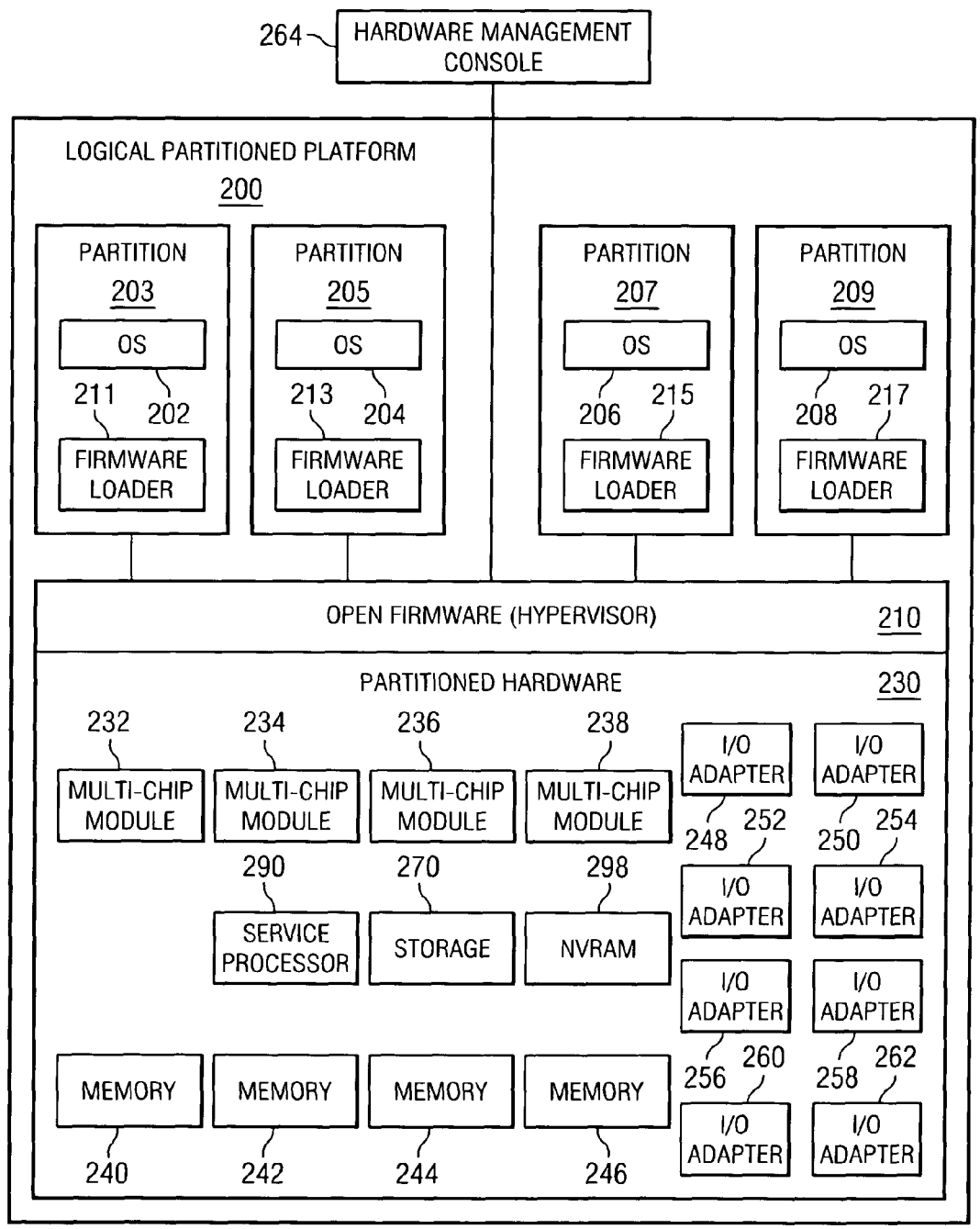
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems (OSs) 202, 204, 206, 208, and open firmware (hypervisor) 210. Operating systems 202, 204, 206, and 208 may be multiple copies of a single operating system or multiple heterogeneous operating systems simultaneously run on platform 200. These operating systems may be implemented using OS/400, which are designed to interface with a hypervisor. Operating systems 202, 204, 206, and 208 are located in partitions 203, 205, 207, and 209.

Additionally, these partitions also include firmware loaders 211, 213, 215, and 217. Firmware loaders 211, 213, 215, and 217 may be implemented using IEEE-1275 Standard Open Firmware and runtime abstraction software (RTAS), which is available from International Business Machines Corporation. When partitions 203, 205, 207, and 209 are instantiated, a copy of the open firmware is loaded into each partition by the hypervisor's partition manager. The processors associated or assigned to the partitions are then dispatched to the partition's memory to execute the partition firmware.

Partitioned hardware 230 includes a plurality of processors on MCMs 232–238, a plurality of system memory units 240–246, a plurality of input/output (I/O) adapters 248–262, and a storage unit 270. Partitioned hardware 230 also includes service processor 290, which may be used to provide various services, such as processing of errors in the partitions. Each of the processors on MCMs 232–238, memory units 240–246, NVRAM storage 298, and I/O adapters 248–262 may be assigned to one of multiple partitions within logical partitioned platform 200, each of which corresponds to one of operating systems 202, 204, 206, and 208.

Hypervisor 210 performs a number of functions and services for partitions 203, 205, 207, and 209 to create and enforce the partitioning of logical partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (nonvolatile RAM). Thus, hypervisor 210 allows the simultaneous execution of independent OSs 202, 204, 206, and 208 by virtualizing all the hardware resources of logical partitioned platform 200.

Operations of the different partitions may be controlled through a hardware management console, such as console 264. Console 264 is a separate data processing system from which a system administrator may perform various functions including reallocation of resources to different partitions.

Figure 3:
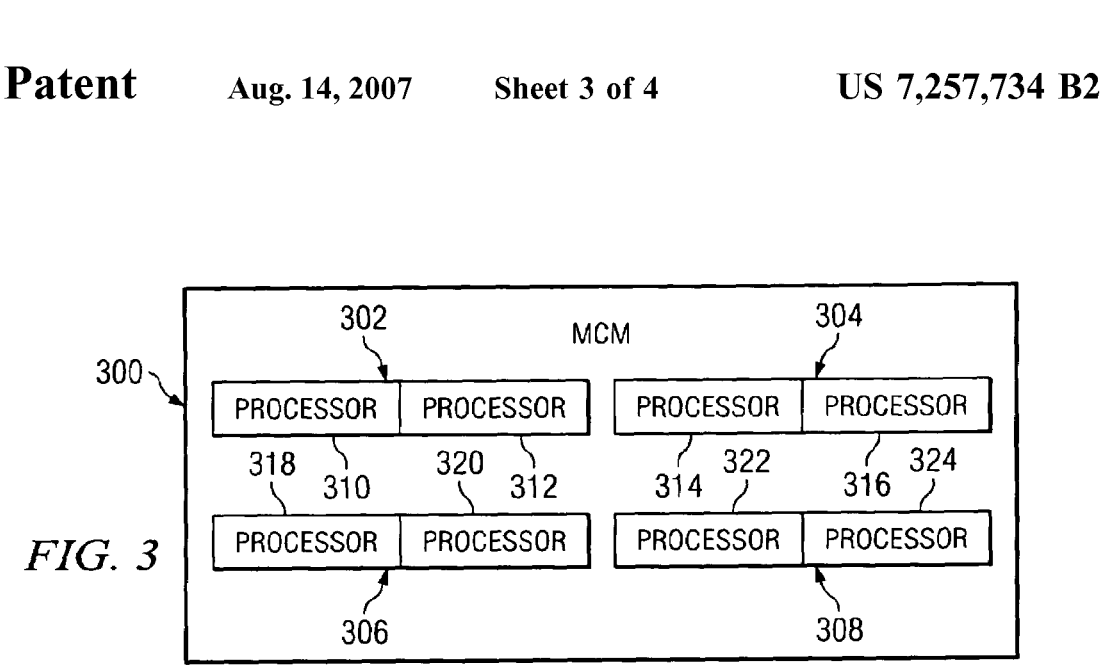
FIG. 3 is a block diagram of a multi-chip module in accordance with a preferred embodiment of the present invention.

Turning next to FIG. 3, a block diagram of a multi-chip module is depicted in accordance with a preferred embodiment of the present invention. Multi-chip module (MCM) 300 may be implemented as a MCM in FIGS. 1 and 2. MCM 300 included dies 302, 304, 306, and 308. Each of these dies included two processors. Die 302 includes processor 310 and 312. Die 304 includes processor 314 and 316. Die 306 includes processor 318 and 320. Die 308 includes processor 322 and 324.

Currently, a single MCM, such as MCM 300, is designated as containing the spare processors. In accordance with a preferred embodiment of the present invention, a different type of designation is employed. Instead, each MCM in a system has at least one processor marked as a spare processor.

In this example, processor 324 is marked or identified as the spare or replacement processor. As a result, if a processor, such as processor 320 fails, processor 324 is used and processor 320 is stopped or removed from use. In other words, the spare CPU is picked from the same MCM where a CPU failure occurs. Since these processors are all located on the same MCM, memory latency and cache affinity problems are avoided. A spare processor from a different MCM is used on if a spare processor is unavailable on the MCM on which the failure occurred.

Figure 4:
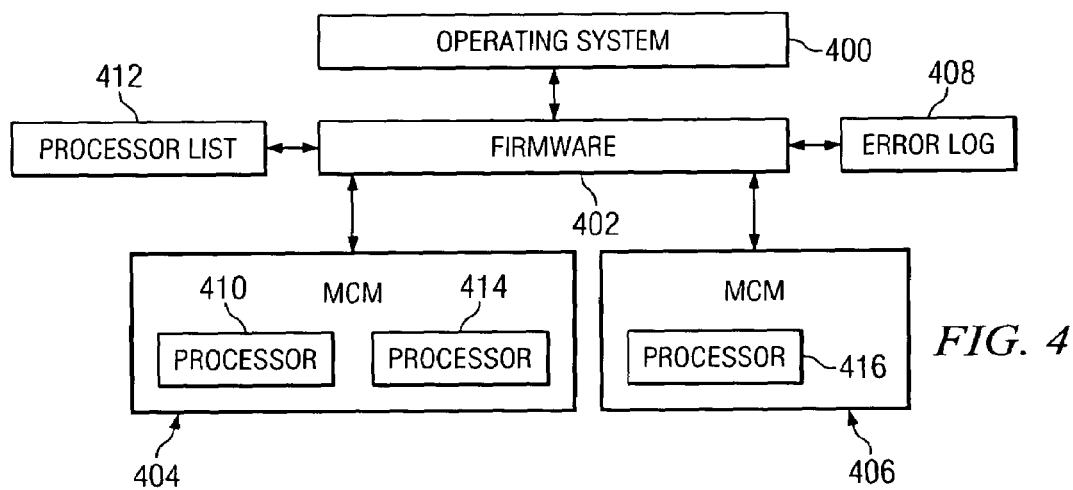
FIG. 4 is a block diagram of components used in detecting and replacing failed processors in accordance with a preferred embodiment of the present invention.

Turning next to FIG. 4, a block diagram of components used in detecting and replacing failed processors is depicted in accordance with a preferred embodiment of the present invention. In this example, operating system 400 is an example of an operating system such as OS 202 in FIG. 2. Firmware 402 may be implemented as hypervisor 210 in FIG. 2. In these examples, a failure of a processor in multi-chip module (MCM) 404 or 406 is detected by firmware 402. Such a failure of a processor results in the failing processor being stopped and error log 408 being generated by firmware 402. This error log identifies the failed processor. Operating system 400 periodically checks error log 408 for failures in these examples.

Upon detection of a failure, operating system 400 makes calls to firmware 402 to obtain and route processing requests to a replacement processor. In these examples, the replacement processor is identified as a processor in the same MCM as the failed processor. Firmware 402 identifies the replacement processor for operating system 400 in these examples. The identified replacement processor is assigned to the partition for operating system 400 by firmware 402.

For example, firmware 402 detects a failure of processor 410 in MCM 404. Firmware 402 includes a function, referred to as an event-scan function, that is called periodically to check for the occurrence of a hardware event, including processor failures. Another function, referred to as a check-exception function is called to provide further detail on what platform event has occurred. When such an event is present, firmware 402 may use this function to examine hardware registers to identify the type of error as well as identify the component in which the error has occurred. Such a function is present in RTAS. This failure of processor 410 is placed into error log 408. Operating system 400 monitors error log 408 on a periodic basis, such as once per second. In response, operating system 400 requests a replacement processor from firmware 402. Firmware 402 identifies this replacement processor from processor list 412, which contains a list of processors, which may be used as hot spares to replace a failed processor. List 412 is typically stored in a non-volatile memory, such as NVRAM 298 in FIG. 2.

In this example, processor 414 is identified as the replacement processor for the failed processor, processor 410. This replacement processor also is located in MCM 404. This selection is made by firmware 402 to protect memory latency and the cache affinity of long-running applications that are performance sensitive. As illustrated, processor 416 also is a replacement processor, but is not selected by firmware 402 to replace processor 410. Processor 416 is only used to replace processor 410 if a spare processor is not present in MCM 404.

In these examples, only a single operating system is illustrated to explain the mechanism of the present invention. Other operating systems for other partitions are also managed by firmware 402 using the process described above. Firmware 402 reports an error to each partition running an instance of an operating system to which a failed processor is assigned. This report includes an identification of the processor as well as an indication of the type of error.

Figure 5:
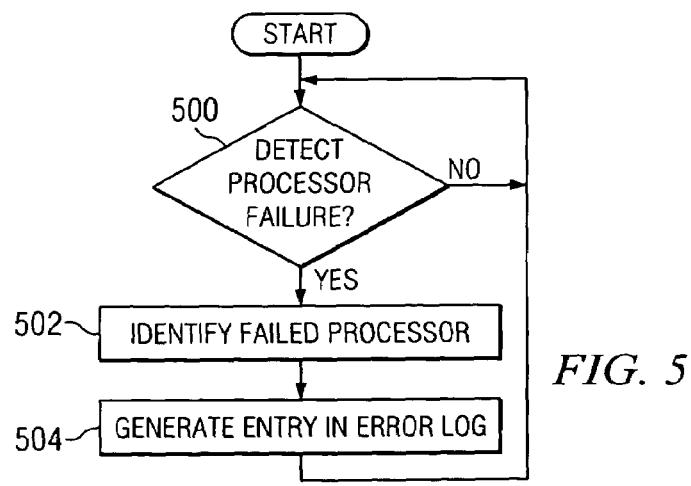
FIG. 5 is a flowchart of a process for detecting a failure of a processor in accordance with a preferred embodiment of the present invention.

Turning now to FIG. 5, a flowchart of a process for detecting a failure of a processor is depicted in accordance with a preferred embodiment of the present invention. This process may be implemented within firmware 402 in FIG. 4.

The process begins by determining whether a failure of a processor has been detected (step 500). If a failed processor is not detected, the process returns to step 500. Upon detecting a processor failure, the failed processor is identified (step 502). Thereafter, an entry is generated in an error log to identify the processor failure (step 504) with the process then returning to step 500 as described above.

Figure 6:
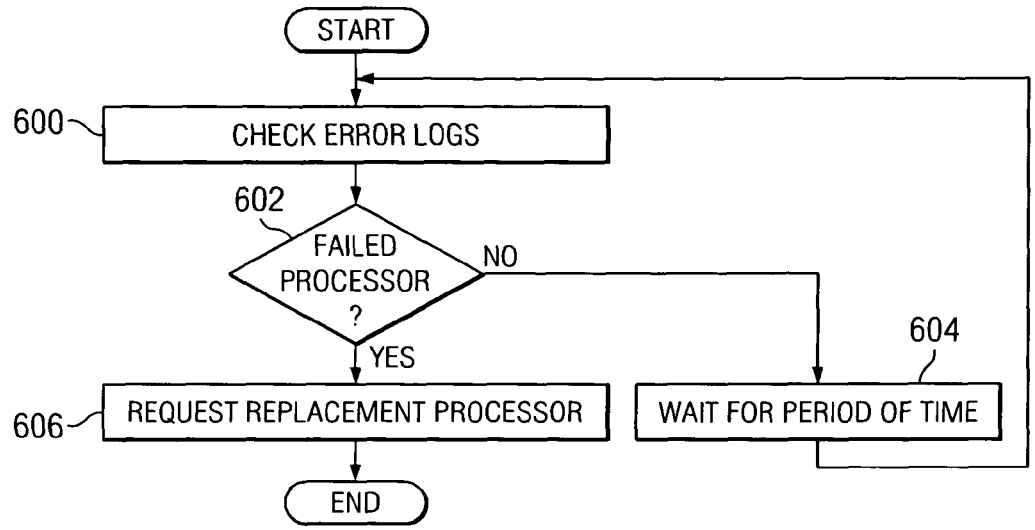
FIG. 6 is a flowchart of a process for replacing a failed processor in accordance with a preferred embodiment of the present invention.

Turning next to FIG. 6, a flowchart of a process for replacing a failed processor is depicted in accordance with a preferred embodiment of the present invention. The process illustrated in FIG. 6 may be implemented in an operating system, such as operating system 400 in FIG. 4 in these examples.

The process begins by checking error log (step 600). A determination is then made as to whether a failed processor has been identified (step 602). If a failed processor is not detected from the error logs, the process waits for a period of time (step 604) with the process then returning to step 600 as described above. In these examples, the period of time is set at one second.

With reference again to step 602, if a failed processor is detected, a request for a replacement processor is made (step 606) with the process terminating thereafter. In these examples, this request is sent to firmware in the data processing system.

Figure 7:
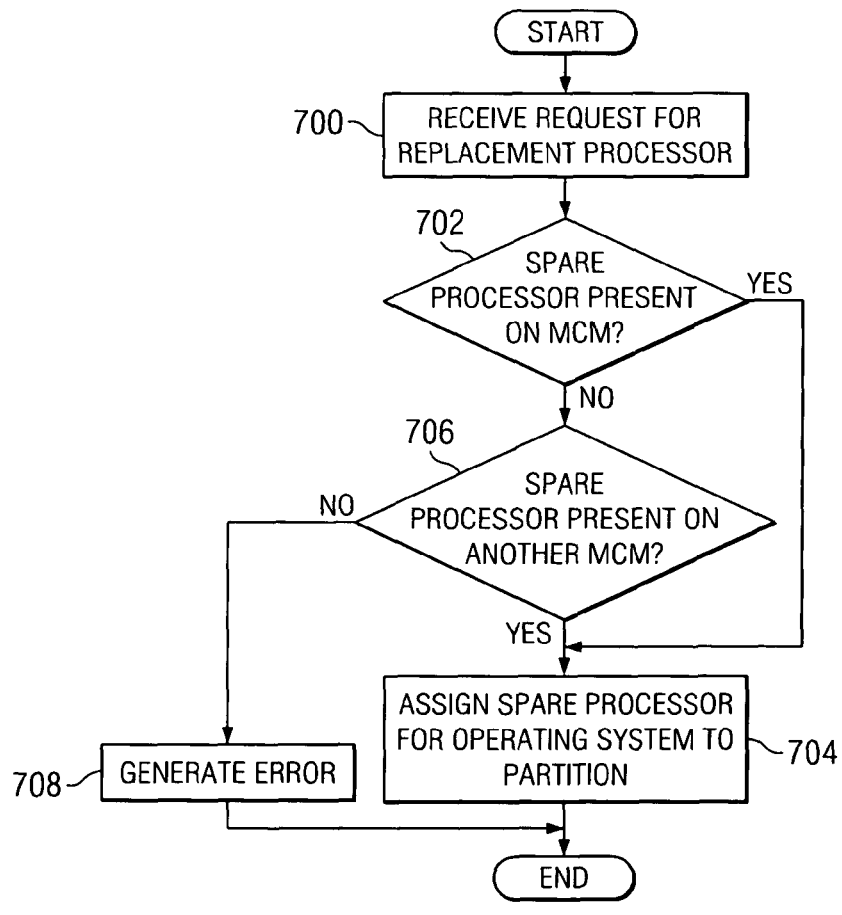
FIG. 7 is a flowchart of a process for providing a replacement processor in accordance with a preferred embodiment of the present invention.

Turning next to FIG. 7, a flowchart of a process for providing a replacement processor is depicted in accordance with a preferred embodiment of the present invention. The process illustrated in FIG. 7 may be implemented in firmware, such as firmware 402 in FIG. 4.

The process begins by receiving a request for a replacement processor (step 700). This request is received from an operating system in these examples. A determination is made as to whether a spare processor is present on the MCM on which the failed processor is located (step 702). If such a spare processor is present on the MCM, then a spare processor is assigned to the partition for the operating system (step 704) with the process terminating thereafter.

With reference again to step 702, if a spare processor is not present on the MCM, a determination is made as to whether a spare processor is present on another MCM in the data processing system (step 706). If a spare processor is present on another MCM, then this spare processor is assigned to the partition in step 704. Such an assignment, however, does not provide the protection against memory latency and cache affinity problems. This type of assignment, however, allows the partition in the data processing system to continue execution.

With reference again to step 706, if a spare processor is not present on another MCM on the data processing system, then an error is generated because a spare processor to replace the failed processor is unavailable (step 708) with the process terminating thereafter.

Thus, the present invention provides a method, apparatus, and computer instructions for replacing failed processors with spare processors in a manner that avoids memory latency and cache affinity problems. The mechanism of the present invention marks certain processors on different MCMs as being spare processors, rather than placing all the spare processors on a single MCM. When a failed processor is detected, its replacement is selected from a spare processor on the same MCM as the failed processor.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs, The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a multi-processor data processing system for managing processors, the method comprising:
responsive to detecting a failed processor in a first set of processors on a first multi-chip module, determining whether a first spare processor from said first set of processors is available to replace said failed processor;
in response to determining that said first spare processor is available, assigning the first spare processor to replace the failed processor;
in response to determining that said first spare processor is unavailable, determining whether a second spare processor from a second set of processors on a second multi-chip module is available to replace said failed processor;
in response to determining that said second spare processor is available, assigning the second spare processor to replace said failed processor; and
simultaneously utilizing said first multi-chip module to execute code for a first operating system and utilizing said second multi-chip module to execute code for a second operating system.

2. The method of claim 1, wherein the first spare processor and the second spare processor are each marked for use as a spare.

3. The method of claim 1 further comprising:
assigning said first multi-chip module to a first logical partition of hardware; and
assigning said second multi-chip module to a second logical partition of hardware.

4. The method of claim 1, wherein the first spare processor and the second spare processor are each marked by an open firmware.

5. The method of claim 1, wherein the failed processor and the first spare processor are included in one die.

6. The method according to claim 1, wherein said first operating system and said second operating system are different types of operating systems.

7. A multi-processor data processing system for managing processors, the data processing system comprising:
determining means, responsive to detecting a failed processor in a first set of processors on a first multi-chip module, for determining whether a first spare processor from said first set of processors is available to replace said failed processor;
in response to determining that said first spare processor is available, assigning means for assigning the first spare processor to replace said failed processor;
determining means, responsive to determining that said first spare processor is unavailable, for determining whether a second spare processor from a second set of processors on a second multi-chip module is available to replace said failed processor;
assigning means, responsive to determining that said second spare processor is available, for assigning the second spare processor to replace said failed processor; and
utilizing means for simultaneously utilizing said first multi-chip module to execute code for a first operating system and utilizing said second multi-chip module to execute code for a second operating system.

8. The multi-processor data processing system of claim 7, further comprising marking means for marking the first spare processor and the second spare processor for use as a spare.

9. The multi-processor data processing system of claim 7 further comprising:
said first multi-chip module assigned to a first logical partition of hardware; and
said second multi-chip module assigned to a second logical partition of hardware.

10. The multi-processor data processing system of claim 7, further comprising marking means for marking the first spare processor and the second spare processor by an open firmware.

11. The multi-processor data processing system of claim 7, wherein the failed processor and the first spare processor are included in one die.

12. The multi-processor data processing system according to claim 7, wherein said first operating system and said second operating system are different types of operating systems.

* * * * *